United States Patent [19]

Slawinski

[11] 4,205,611

[45] Jun. 3, 1980

[54] PLASTIC LAMINATE EXPLOSIVE EMULSION PACKAGE

[75] Inventor: Frank E. Slawinski, New Ringgold, Pa.

[73] Assignee: Atlas Powder Company, Tamaqua, Pa.

[21] Appl. No.: 890,461

[22] Filed: Mar. 27, 1978

[51] Int. Cl.² .............................................. F42B 3/00
[52] U.S. Cl. .................................................. 102/24 R
[58] Field of Search ...................... 102/22 R, 23, 24 R

[56] References Cited

U.S. PATENT DOCUMENTS

| 1,762,044 | 6/1930 | Bedient | 102/24 R |
| 3,731,625 | 5/1973 | Slawinski | 102/24 R |
| 3,921,529 | 11/1975 | McKee | 102/24 R |
| 4,052,939 | 10/1977 | Simmons et al. | 102/24 R |

FOREIGN PATENT DOCUMENTS 1003693  1/1977  Canada ...................................... 102/24

Primary Examiner—Charles T. Jordan
Attorney, Agent, or Firm—Richards, Harris & Medlock

[57] ABSTRACT

A package for water-in-oil explosive emulsion products is provided which includes a laminate film capable of being employed with conventional types of packaging apparatus and which provides excellent resistance to degradation as a result of contact with the external oil phase of the explosive as well as excellent structural properties both during storage and under field use conditions. The laminate film material comprises an inner sealing film means, an outer structural film means and an oil barrier means intermediate of the inner and outer films.

21 Claims, 1 Drawing Figure

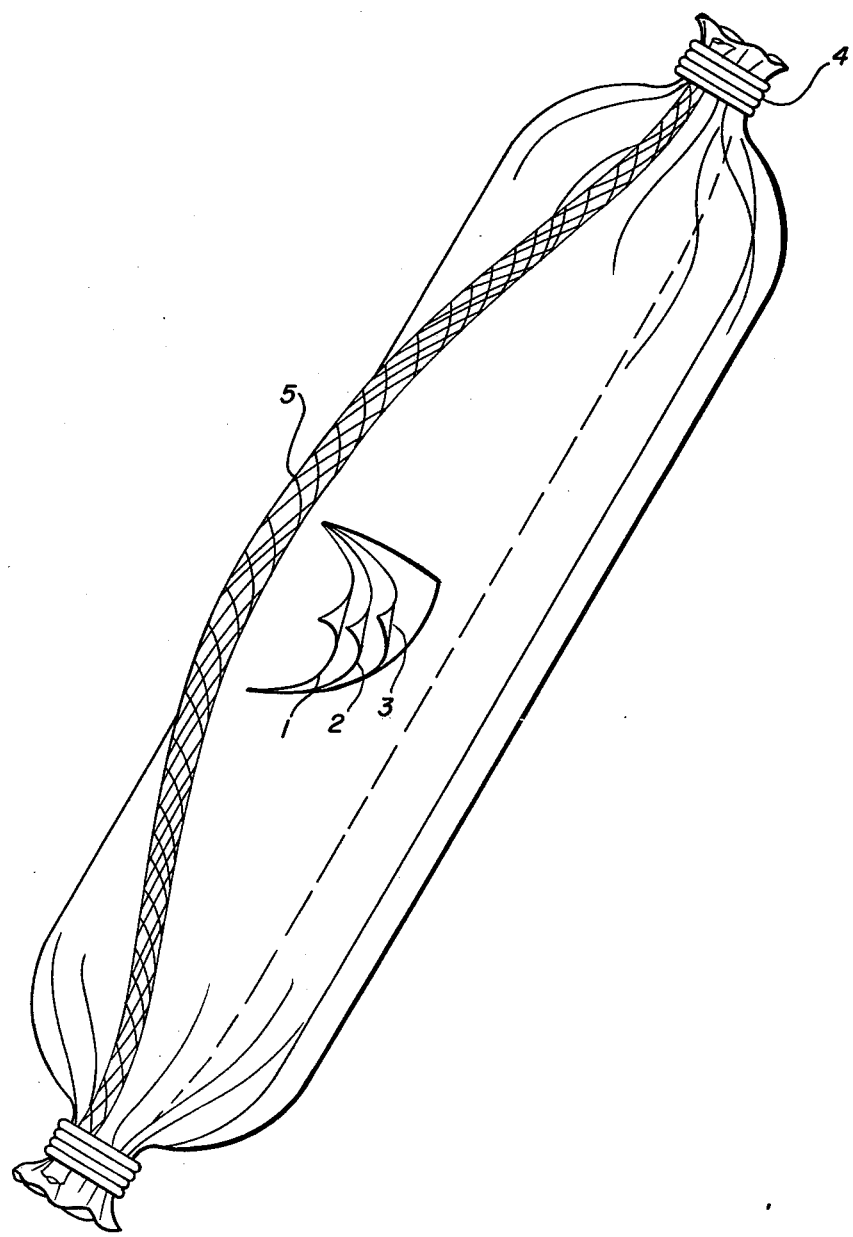

PLASTIC LAMINATE EXPLOSIVE EMULSION PACKAGE

BACKGROUND OF THE INVENTION

The packaging of slurry explosive compositions in plastic bags is one important method for distributing such explosives as saleable products. Plastic bags which can be easily fabricated by side sealing with available packaging apparatus are an especially efficient means for producing such products. In the past, flexible polyvinyl chloride film has been used successfully to package water-in-oil emulsion type slurry explosive compositions. An example of such packaging materials include the skin tight packages described in U.S. Pat. No. 3,731,625 to Slawinski.

Referring especially to water-in-oil type emulsion explosive compositions, recently improved products of this variety have been discovered which employ void producing materials as sensitizing agents in place of the occluded air or other gases which have been used in emulsion explosives in the past. Examples of this new improved type of emulsion explosive are set forth in U.S. Application Ser. No. 848,333, filed Nov. 3, 1977. These new explosive emulsion compositions are processed at significantly higher temperatures than were conventional emulsion explosive compositions. Thus, temperatures of 150° to 200° F. are normally employed and packaging operations normally will occur at these higher temperatures. Such higher temperatures adversely affect the structural properties of polyvinyl chloride films and may cause swelling which produces an air space or sag in the package which is both unattractive and may affect the propagation of the explosive from one container to the next when a plurality of explosive packages are stacked in a borehole. Thus packaging films which can be employed with conventional types of packaging apparatus, in order to automate packaging operations, and which retain good structural integrity at temperatures in the range of from about 150° to 200° F. are desirable.

Another requirement for packaging films which are employed with emulsion explosive compositions is that the film be resistent to degradation which can result from contact of some plastics with the external oil phase of such explosive compositions. Continual contact of the film package with the external oil phase can cause swelling and wrinkling of the package under storage conditions. Thus resistance to such degradation is a required characteristic for useful packaging films.

Finally, the packaging film for the emulsion explosive compositions must be strong enough to resist rupture upon impact when dropped during normal handling or under field usage conditions.

SUMMARY OF THE INVENTION

I have discovered that by employing certain laminated plastic films a packaged product containing water-in-oil emulsion explosive compositions can be produced which can be machine fabricated, is resistant to degradation from the oil phase of the explosive compositions, and which resists deformation at product packaging temperatures of 150° to 200° F. These laminate film packaged explosives are resistent to rupture under rough handling and field use conditions. Films useful in producing these packaged explosives are provided by laminating an inner sealing film means, an outer structural film means, selected from the group existing of woven and cross oriented films of polyolefins, and an oil barrier means intermediate of the inner and outer films. The inner sealing film means, structural film means, and oil barrier means cooperate such that a sausage-like package of emulsion explosive composition can be fabricated which will not be degraded by the presence of the external oil phase of the product under storage conditions and which has sufficient strength to guard against rupture or breakage during field use.

The inner sealing film means insures that when a length of the film material is wrapped around the mandrel of an automatic packing device, and the overlapped edges thereof are sealed, good bonding will occur between the inner (sealing film) and outer surface (structural film) of the film material. Thus by employing a relatively thin film of a polyolefin of the same type as that of the outer structural film a bonding of like material to like material can be achieved. The oil barrier means, which can comprise a separate oil resistant film material or can be an oil resistant adhesive which is used to bond the inner sealing film means to the outer structural film means, or an oil resistant lamination primer, serves to arrest any degrading effects which the oil external phase of the emulsion explosive may have, thus protecting the structural properties of the outer film means. The structural outer film means provides the strength necessary for the packaged product to resist, (a) rupture, upon being shipped and subjected to rough handling, (b) breakage, during field use in which the package containers may be dropped for substantial distances into boreholes, and (c) elongation or stretching during storage at elevated ambient temperatures such as, for example, 90° F.

In a particularly preferred embodiment of the present invention the package for explosive emulsion comprises a tubular member prepared from the above identified type of film which is closed at either end with metal clips to form a sausage like container. Further, plastic netting material, or other slip resistant tough material, running longitudinally along the tubular member formed by the film and attached to the package at each end thereof by the metal clips can be provided so that a multiple number of the emulsion explosive packages can be linked together, or tied to a line for lowering into boreholes, for example. The slip resistant material employed is compatible with the packaging equipment which forms the tubular member from the above described types of film and, therefore, can be attached to the emulsion explosive package automatically at the time of packaging.

The explosive emulsion package of the present invention can be better understood from a study of the drawing which is a perspective view of an explosive emulsion package with plastic netting attached.

DETAILED DESCRIPTION OF THE INVENTION

The above described types of problems which arise when attempting to package water-in-oil emulsion explosive compositions at temperatures above 150° F., for example, can be overcome, while automation of the packaging process is preserved, by forming the package for the explosive emulsion from the laminate film compositions described herein. Basically, the laminate films used to produce the packaged explosive products of the present invention include three laminate layers each of which provide properties which combine to achieve the desired superior characteristics of the packaged explosive. Referring to the drawing, structural film 1 is provided for the purpose of imparting structural strength to the packaged explosive composition such that the finished package will not rupture, crack, or otherwise burst, during normal handling conditions, or during use in the field. Structural film 1 is preferably a polyolefin film which can be easily sealed using conventional packaging equipment and which, preferably, is either of the cross oriented laminate or woven variety. Cross oriented laminations of high density polyethylene films are manufactured by a process whereby two or more oriented high density polyethylene films are laminated together in order to greatly enhance the properties of the laminate film. An example of such a cross laminate is sold under the trade name Valeron by Van Lear Plastics (USA) Inc., Houston, Tex. Suitable grades of woven high density polyethylene include $8 \times 8$, $10 \times 10$, $9 \times 12$ and $12 \times 12$ woven polyethylene. Similar types of polypropylene can also be used as structural films. As set forth above, the function which the outer structural film 1 (see drawing) serves is to provide strength for the package so as to resist rupture or deformation during storage and use of the packaged emulsion explosive composition and to provide a surface which can be easily sealed using conventional packaging equipment.

Intermediate layer 2 is an oil resistant barrier which protects the outer structural film layer 1 from degradation due to contact with the external oil phase of the water-in-oil emulsion explosive product. Thus, intermediate layer 2 can be provided by laminating an oil resistant film to structural film 1. A relatively thin nylon film can be employed for this purpose. Alternatively, an excess amount of an adhesive having oil resistant qualities can be used between structural film 1 and sealing film 3. For example, urethane based adhesives such as those sold under the trade designation 30-9133-34 by National Adhesive, Inc. have been found to be effective. Finally, lamination primers having oil resistant properties can be employed. In addition to nylon, polyurethane (or urethane bond adhesives) and oil resistant primers, polyesters, saran, polyvinylidene chloride, cellophane, and an oil retardant surface treatment sold by Dow Chemical Co. have shown promise for use as oil barriers. When nylon or polyester films are employed preferred thicknesses are in a range of from about 0.1 to about 3 mils.

Sealing film 3, as shown in the FIGURE, can comprise a low density polyolefin film which provides an inner sealing surface onto which the outer structural film material may be easily bonded using conventional types of packaging apparatus. Low density polyethylene is preferred when the structural film 1 is also fabricated from polyethylene. Suitable thicknesses for such low density polyethylene films are preferably in a range of from about 0.5 to about 4.0 mils. Thus, while the inner low density sealing film layer may be attacked and degraded by the external oil phase of the explosive emulsion product, it will provide the sealing properties necessary for automated packaging operations and the oil barrier intermediate layer 2 will provide the resistance to the oil necessary to protect the structural properties imparted to the packaging material by structural film 1.

The following table lists six films which have been discovered to provide the properties necessary for the production of the packaged emulson explosive product of the present invention. These are preferred films only and are not intended to limit the invention.

TABLE 1

EXEMPLARY LAMINATE FILM MATERIALS

1. Apetex 1082, supplied by A.P. Industries of East Aurora, N.Y. This lamination consists of $12 \times 12$ woven high density polyethylene between plies of 2 mil low density polyethylene. The oil barrier means is provided by the adhesive used in effecting the lamination.
2. Ludlow Corporation's (Holyoke, Mass.) 6 mil Valeron with two mil low density polyethylene bonded with an oil resistant primer.
3. Bryce Corporation's (Memphis, Tenn.) 6 mil Valeron laminated to 3M Corp's Scotchpak 229, using National Adhesives 30-9133-34 urethane adhesive. Scotchpak 229 is a coextrusion of $\frac{1}{2}$ mil polyester and two mil medium density polyethylene.
4. Film as in #3 above except Scotchpak #6 instead of Scotchpak #229. They differ only in that Scotchpak #6 has low density polyethylene rather than medium density polyethylene in the coextrusion.
5. Package Products Company's (Charlotte, N.C.) 6 mil Valeron bonded to 2 mil low density polyethylene using a heavy (0.15 mil) layer of National Adhesive 30-9133-34 urethane adhesive.
6. Package Products Company's (Charlotte, N.C.) 6 mil Valeron, bonded to an intermediate 1 mil ply of nylon film and an inner ply of 2 mil low density polyethylene with National Adhesive 30-9133-34 urethane adhesive.

The above described types of laminate films can be used in conjunction with conventional form fill sealing machines such as those sold by Kartridg-Pak, Inc. Specifically Kartridg-Pak's models 43 and 50 Chub Packers can be employed with the above described types of films. These machines feed the film continuously from a roll and wrap it around a mandrel to form an overlapped tube. The tube is continuously side sealed at the overlap using a hot air or extrusion side sealing unit. The formed tube then passes over a nozzle through which the explosive water-in-oil emulsion is introduced. The filled tube is then clipped with clip means such as metal clips 4, for example, and cut at predetermined lengths to provide discrete sausage-like chubs.

In a preferred embodiment of the present invention a length of slip resistant material capable of binding securely under the clip closures of the package described above. Such materials can be supplied along the roll of plastic laminate material such that as the above described tube is formed around the mandrel of the packaging machine a length of the slip resistant material is positioned longitudinally along the tube of plastic laminate material. Examples of suitable materials include nubby surfaced plastic films (such as PVC, for example) and plastic netting material such as that sold by DuPont under the trade name VEXAR netting. The drawing depicts the use of such a netting material 5. Upon clipping of the ends of the tube with metal clips 4 the netting 5 will tend to gather at each end thereby providing a continuous strand of netting 5 running longitudinally from one metal clip 4 to the other along the side of the emulsion explosive package. The application of a length of slip resistant material in this manner is especially useful since it provides for the stringing together of the packages of explosive products for loading in boreholes, for example. Further, labels can be affixed to the material or printed indicia can appear thereon. Further, the leg wires of blasting caps can be attached to the material after the cap itself has been inserted into the package in a conventional manner.

In order to test the properties of the packaged emulsion explosive product under field conditions and evaluate the strengths of the above identified types of films a series of tests were run on packaged emulsion explosive products manufactured from various types of film materials. Basically, two different types of tests were run. The first type of test run was the DOT (Department of Transportation) box drop test in which 60 pound cases of emulsion explosive, packaged in the various test films, were subjected to three, four foot flat drops. In order to pass this test the packages must not have ruptured or have any loss of product. In the second test the performance of the packaged products under field conditions was tested by loading the packages into boreholes by dropping them 50 feet into 10 feet of water. In order to pass the test the packaged emulsion explosive product must pass rapidly through the water and must not rupture. Finally, in order to test the storage ability of the product, filled sample cartridges were placed under surveillance in 90 degrees F. storage to detect any film deterioration under elevated storage temperature conditions. Results of these tests are set forth in Table II.

failure occurred, the cartridges successfully passed the field borehole loading tests and the DOT box drop test.

While the present invention has been described with relation to its preferred embodiments various modifications thereof will now become apparent to one skilled in the art. It is intended that all such modifications as fall within the scope of the appended claims be covered.

I claim:

1. A package for water-in-oil explosive emulsion composition comprising a flexible tubular film member filled with said explosive and closed at each end, said tubular film member comprising an inner seal forming film, an outer structural film of an olefinic polymer selected from the group consisting of woven and cross oriented laminates, and an oil barrier means interposed between said inner and outer films.

2. The package of claim 1 wherein said tubular film member is closed at each end with metal clips.

3. The package of claim 1 wherein said inner sealing film means is low density polyethylene of a thickness of from about 0.5 to about 4 mils.

4. The package of claim 1 wherein said outer structural film is woven high density polyethylene.

5. The package of claim 1 wherein said outer structural film is a cross laminate of two oriented high density polyethylene films.

6. The package of claim 1 wherein said oil barrier means is selected from the group consisting of nylon and polyester films in a thickness of from about 0.1 to about 3 mils.

7. The package of claim 1 wherein said oil barrier means is provided by a urethane based adhesive used to laminate said outer seal forming film to said inner structural film.

8. The package of claim 1 and further comprising a slip resistant length of material positioned longitudi-

TABLE II

Tests of 3" × 16" Film Packages Filled with Emulsion Explosive

| Film | Type of Side Seal | DOT 4-ft. Drop Tests | Field Borehold Loading Tests | 90° F. Storage Tests |
|---|---|---|---|---|
| Alathon 3442 Lo-Density PE (10 mil) Control | — | Passed | 6 of 10 Ctgs. failed | Elongated 6% in 2 months |
| Package Products 6-mil Valeron 1-mil Nylon 2-mil Lo Dens. PE | Extrusion | Passed | 12 of 12 Ctgs. passed. | No change in 2 months |
| Apitex 1082 2-mil Lo Dens. PE 12 × 12 woven PE 2-mil Lo Dens. PE | Hot Air | Passed | 12 of 12 Ctgs. passed. | No change in 2 months |
| Ludlow's 6-mil Valeron Oil Resis. Primer 2-mil Lo Dens. PE | Extrusion | Passed | 10 of 10 Ctgs. passed | No change in 2 months |
| Bryce's Scotchpak #229 6-mil Valeron | Extrusion | Passed | 35 of 36 Ctgs. passed* | No change in 2 months |
| 6-mil Valeron Scotchpak #6 | Extrusion | Passed | 16 of 16 Ctgs. passed | No change in 2 months |
| Package Products 6-mil Valeron 0.15 mil urethane 2-mil Lo Dens. PE | Extrusion | Passed | 16 of 16 Ctgs. passed | No change in 2 months |

*Seal failure. Film intact.

It can be noted that Alathon 3442, a 10 mil low density polyethylene control cartridge passed the DOT 4 foot box drop test however it evidenced 60% failures in the field borehole loading tests. Additionally, this film showed excessive degradation after two months in the 90° F. storage tests. In contrast, the explosive compositions packaged using the film materials disclosed by the present invention showed no degradation in storage and, with the exception of one cartridge where seal nally along said tubular film member and affixed at each end by the closure means thereof.

9. A package for water-in-oil explosive emulsion composition comprising a laminate film material formed into a tubular shape said laminate film comprising an inner seal forming film, an outer structural olefinic polymer film selected from the group consisting of woven and cross oriented films, and an oil barrier means intermediate of said inner and outer films, said laminate film material being resistant to deformation at temperatures of from about 150 to about 200 degrees F., resistant to degradation resulting from contact with the exterior oil phase of said explosive composition and resistant to impact rupture.

10. The package of claim 9 and further comprising metal clip members for closing the open ends of said tubular shaped film.

11. The package of claim 10 and further comprising a length of slip resistant material positioned longitudinally along the length of said tubular film and affixed at each end by the metal clip members thereof.

12. The package of claim 9 wherein said seal forming film is low density polyethylene of from about 0.5 to about 4 mils in thickness.

13. The package of claim 9 wherein said structural olefinic polymer film is polyethylene.

14. The package of claim 9 wherein said oil barrier means is selected from the group consisting of nylon and polyester films in a thickness of from about 0.1 to about 3 mils.

15. The package of claim 9 wherein said oil barrier means is provided by a urethane adhesive material used to bond said inner film to said outer film.

16. In a flexible film package for water-in-oil explosive emulsion compositions the improvement wherein the flexible film employed comprises:
   (a) an outer structural film selected from the group consisting of woven and cross oriented laminates of polyolefins;
   (b) an inner sealing film capable of thermally bonding to said outer laminate of structural film; and
   (c) an oil barrier means intermediate of said inner and outer films for protecting said outer structural film from degradation by the external oil phase of said explosive composition.

17. The improved package of claim 16 and further comprising metal clip members sealing each end of a tubular member formed from said flexible film.

18. The package of claim 17 and further comprising a length of slip resistant material positioned longitudinally along said tubular member and affixed at each end thereof by said metal clip members.

19. The improved package of claim 16 wherein said outer structural film is fabricated from polyethylene.

20. The improved package of claim 16 wherein said inner sealing film is polyethylene film of a thickness of from about 0.5 to about 4 mils.

21. The improved package of claim 16 wherein said oil barrier means is selected from the group consisting of nylon film, polyester film, urethane based adhesives, oil resistant lamination primers and combinations thereof.

* * * * *